Patented Sept. 12, 1922.

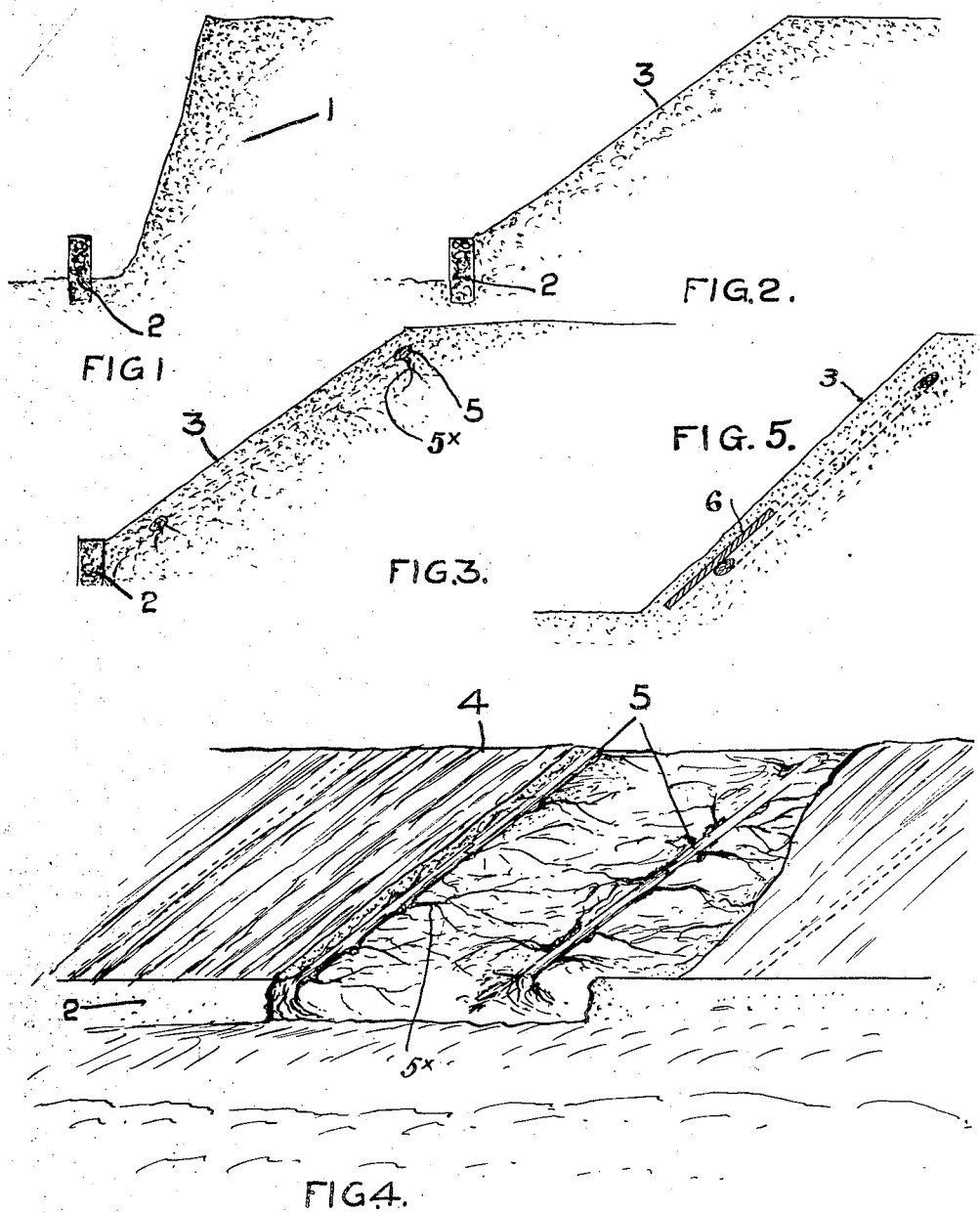

1,428,808

UNITED STATES PATENT OFFICE.

OLIVER STAUFFER SCHIEFELE, OF CONESTOGO, ONTARIO, CANADA.

METHOD FOR PREVENTING THE UNDERMINING OF WATER-WASHED BANKS.

Application filed November 10, 1921. Serial No. 514,347.

*To all whom it may concern:*

Be it known that I, OLIVER STAUFFER SCHIEFELE, a subject of the King of Great Britain, and a resident of the town of Conestogo, in the county of Waterloo, in the Province of Ontario, Canada, have invented certain new and useful Improvements in Methods for Preventing the Undermining of Water-Washed Banks, of which the following is the specification.

My invention relates to improvements in methods for preventing the undermining of water washed banks and the object of the invention is to provide a simple and quick means for holding the soil forming the exposed surface of the bank together so that it will not be affected to any appreciable extent by water wash or by the action of wind thereagainst and it consists essentially of reducing the slope of the bank to a gradual slope, then planting at suitable spaced distances apart live stripped tree trunks parallel with the surface of the bank and at an angle to the bank base as hereinafter more particularly explained by the following specification.

Fig. 1 is a sectional view of a bank in its natural state.

Fig. 2 is a similar view to Fig. 1 showing the bank reduced preparatory to planting it as hereinafter described.

Fig. 3 is a sectional view through the bank after being treated by my process.

Fig. 4 is a front elevation of the bank broken away to show the tree trunks planted thereon.

In the drawings like letters of reference indicate corresponding parts in each figure.

1 indicates a bank adjacent to the shore of a lake or similar body of water. I first build a low retained wall 2 in proximity to the base of the bank 1. I then reduce the slope of the bank by blasting or other suitable means so as to produce a gradual incline as indicated at 3, Fig. 2, so as to make the surface of the bank suitable for cultivation. The inclined surface of the bank is then ploughed in a laterally inclined direction as indicated at 4, Fig. 4. I then strip live tree trunks of branches and place them in the furrows as indicated at 5 at suitable distances apart.

As the cultivating proceeds, these trunks are covered over with a few inches of soil and in due time would sprout from end to end so as to form a mass of root fibres 5× extending outward therefrom and interlacing with the root fibres of the next adjacent tree trunks.

It may be said that before ploughing the surface of the bank, holes are dug at the base of the bank so as to receive the roots at the base of the tree trunk. It will also be understood that a vegetation would also spring up all over the bank from these trunks and interlaced roots thereby covering the whole bank and producing a wind break so that the bank cannot be undermined to a dangerous extent either by the action of the wind or by water washing against the base of the bank or flowing downward over its surface. In low banks one tree trunk would be of sufficient length to extend from the top to the bottom of the bank, but in cases where very high banks have to be reinforced I splice tree trunks together endwise, the spliced joints in course of time growing one into the other, thereby forming a continuous reinforcement from the top to the bottom of the bank.

The retaining wall 2 serves to prevent the water undermining the lower portion or base of the bank. When the water is at high level in the spring of the year the waves beat against the clay banks, slowly cutting away the lower slope until such a time that the support formed by the undermining soil is weakened so that the bank breaks away, this action being repeated until another break takes place. These breaks mostly take place in the spring of the year when the soil is heavy with moisture. By my method of permeating the soil with root fibre such as hereinbefore disclosed, the surface of the bank is bound together so as to eliminate any possibility of slides taking place.

Heretofore has been the practice to plant trees on the slopes of a bank in a vertical position. These have very little effect in holding the bank together as the lower portion of the bank is washed away and the standing trees slide with the supporting earth down the bank.

As has been before described when planting the trees according to my method the base or root of the tree, which is preferably willow, is placed in a hole dug at the base of the bank. The hole, filling with water, supplies the roots of the trees with moisture and ensures rapid growth and root promotion, causing the tree trunk or pole to sprout with roots from end to end producing a root fibre hereinbefore described. The root fibre binds the earth forming the surface of the bank together.

It may be found necessary to protect the lower portion of the bank instead of using a retaining wall as hereinbefore described by nailing boards to the lower portions of the portion of the willow poles which will form a protection until the roots are strong enough to resist the splashing. The boards could then be removed and used again in a new planting. I preferably plant the trees as above described from five to eight feet apart and then trim off the shoots on the poles about said distance, which would make a systematic forest over the surface of the bank of straight tall trees.

From this description it will be seen that I have devised a very simple means whereby a bank may be reinforced so that it will withstand the action of the weather or the wash of the water for a long period of time.

What I claim as my invention is:

1. A method for preventing the undermining of water washed banks consisting of first stripping live tree trunks and planting them in a recumbent position parallel with the surface of the bank and at an acute angle to the bank base and then forming a protecting wall in front of the lower portion of such tree trunks.

2. A method for preventing the undermining of water washed banks consisting of reducing the bank to a gradual slope, then cultivating the slope of the bank to form furrows at an acute angle at the base of the bank, then stripping live tree trunks of their branches, planting the tree trunks in a recumbent position within the furrows at suitable distances apart and then forming a low protecting wall at the base of the bank.

3. A method for preventing the undermining of water washed banks consisting of reducing the bank to a gradual slope, then cultivating the bank in furrows extending at an acute angle to the base of the bank, then forming holes at the base of the bank into which water is adapted to seep, then stripping live tree trunks of their branches, then planting the stripped tree trunks in the furrows in a recumbent position at suitable distances apart and with the roots in the aforesaid holes and then forming a low protecting wall along the lower portion of the bank.

4. A method for preventing the undermining of water washed banks consisting of first stripping live tree trunks and planting them in a recumbent position parallel with the surface of the bank and at an acute angle to the bank base.

OLIVER STAUFFER SCHIEFELE.